(12) United States Patent
McFarland

(10) Patent No.: US 6,413,073 B2
(45) Date of Patent: Jul. 2, 2002

(54) APPARATUS FOR PRODUCING STRANDED, GROUND, MEAT PRODUCTS

(75) Inventor: Archie Rae McFarland, Herriman, UT (US)

(73) Assignee: Diamond Stainless, Inc., Draper, UT (US)

( * ) Notice: Subject to any disclaimer, the term of this patent is extended or adjusted under 35 U.S.C. 154(b) by 0 days.

(21) Appl. No.: 09/892,375

(22) Filed: Jun. 26, 2001

Related U.S. Application Data

(63) Continuation of application No. 09/377,255, filed on Aug. 19, 1999, now abandoned.

(51) Int. Cl.[7] .................................................. A22C 7/00
(52) U.S. Cl. ..................... 425/382 R; 425/464; 426/92; 426/513; 426/516; 426/646
(58) Field of Search .......................... 425/133.1, 382 R, 425/464; 426/92, 516, 646, 513

(56) References Cited

U.S. PATENT DOCUMENTS

| | | |
|---|---|---|
| 3,881,984 A | 5/1975 | Soda et al. |
| 3,903,315 A | 9/1975 | Giles et al. |
| 4,004,742 A | 1/1977 | Hess |
| 4,221,621 A | 9/1980 | Seki et al. |
| 4,340,994 A | 7/1982 | dos Santos et al. |
| 4,535,505 A | 8/1985 | Holly et al. |
| 4,699,325 A | 10/1987 | Hess |
| 4,728,524 A | 3/1988 | Gagliardi, Jr. |
| 4,731,006 A | 3/1988 | Freda et al. |
| 4,834,999 A | 5/1989 | Matthews et al. |
| 4,937,089 A | 6/1990 | Ikoma et al. |
| 5,124,096 A | 6/1992 | Brambilla |
| 5,186,970 A | 2/1993 | Ogiwara et al. |
| 5,198,261 A | 3/1993 | Sasaki |
| 5,516,472 A | 5/1996 | Laver |
| 5,665,419 A | 9/1997 | Teraguchi et al. |
| 5,765,768 A | 6/1998 | Gagliardi, Jr. |

*Primary Examiner*—Nam Nguyen
*Assistant Examiner*—Joseph Leyson
(74) *Attorney, Agent, or Firm*—Mallinckrodt & Mallinckrodt; Philip A. Mallinckrodt; Robert R. Mallinckrodt

(57) ABSTRACT

The disclosed invention includes extrusion apparatus, wherein and by which ground meat replicates selected cuts of natural, unground meat. A ground meat product substantially free of bone and heavy tissue is extruded through a die having a perforated area extending sidewise of the die and constituting at least one row of a series of elongate openings extending closely end-to-end along the perforated area in preferably multilayer rows, the openings of the outer layers of which preferably intercommunicate end-to-end, or even interconnected end-to-end so that a continuous ribbon-shaped, stranded, intermediate product is extruded and may be cut transversely to make final, stranded meat products, both intermediate and final products being preferably enclosed substantially peripherally by an envelope of side by side, substantially merged, longitudinal strands of ground meat that substantially replicates a cut of natural, unground meat.

13 Claims, 3 Drawing Sheets

APPARATUS FOR PRODUCING STRANDED, GROUND, MEAT PRODUCTS

RELATED APPLICATION

Figure 1:
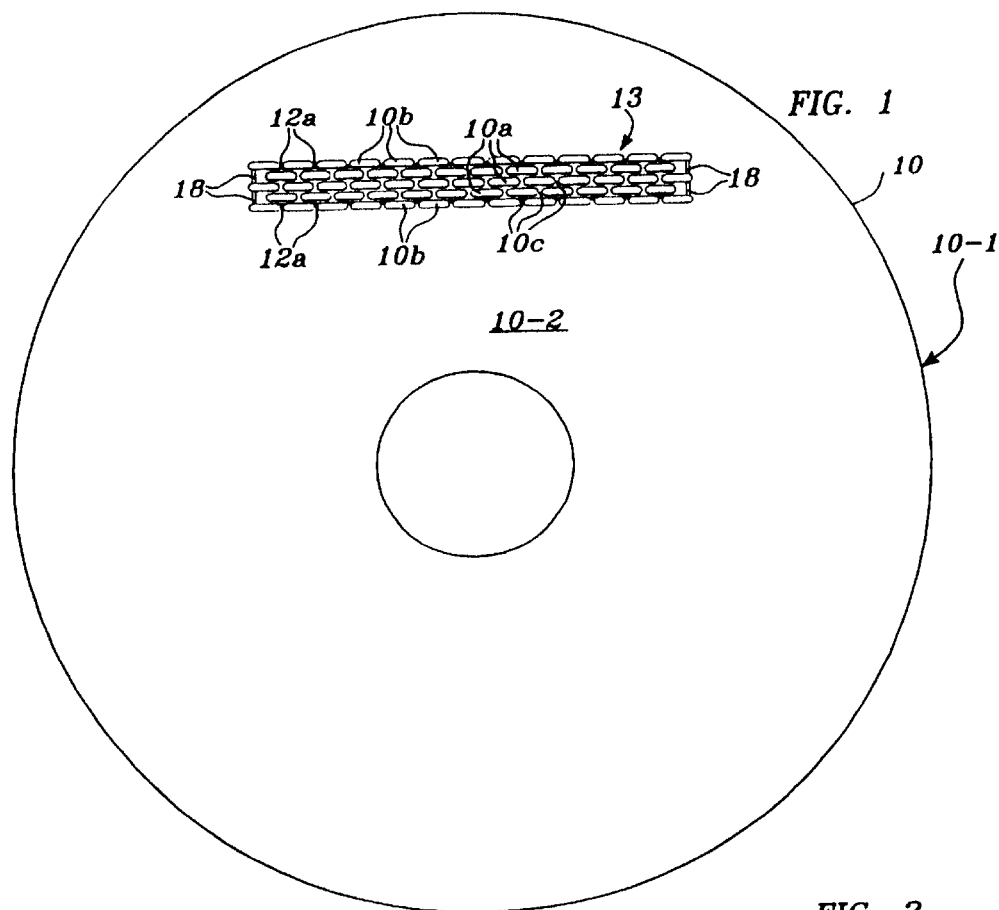

This application is a continuation of application Ser. No. 09/377,255 filed on Aug. 19, 1999, now abandoned.

BACKGROUND OF THE INVENTION

1. Field

This invention is in the field of ground meat products and methods of making them and is concerned particularly with the production of a novel, extruded, ground meat product having elongate, side-by-side strands of muscle fiber, with or without fat, that are preferably largely enclosed peripherally of the product by an envelope of merged extrudate.

2. State of the Art

Many different meat products have been produced by various procedures and using various machines or other apparatus through the many, many years that people have been eating meat as a food. Thus, chunks of beef have long been ground by extrusion under pressure through a perforated, thick, metal die plate, across the entry face of which is rotated a multibladed cutting knife in the making of hamburger patties or meat loaves, or the stuffing for sausages or for split primal cuts, such as flank steaks or pork chops. Other meats, such as chicken, turkey, and fish have been forced through perforations of metal tubes as ground skeletal remains of the chicken, turkey, or fish are moved within the tubes from inlet ends to outlet ends thereof by an auger screw in so-called deboning machines.

Almost universally, the relatively small extrusion openings of perforated extrusion plates or tubes used in these machines have been and are circular, as they are in the thick, circular, extrusion die plates produced by Speco, Inc. of Schiller Park, Ill., for meat grinders in accordance with U.S. Pat. No. 4,004,742. However, relatively large openings of various shapes are employed in some of the Speco, Inc.'s extrusion plates for mincing and otherwise cutting and forming meat and other foods.

In U.S. Pat. No. 5,765,768, issued Mar. 6, 1996, for PLATE FOR USE ON THE OUTLET OF A FOOD GRINDER FOR MAKING SHEETS OF FOODS, inventor Eugene A. Gagliardo, Jr. discloses and claims the provision of narrow but very long, straight or curved, extrusion openings extending entirely (some about halfway) across the entry and outlet faces of and through the usual thick, circular, metal die plate of a conventional meat grinder, so as to produce separate, relatively wide sheets of a meat or other food material that are ground by and extruded through the die plate. This patent describes the theretofore prior art and how it is improved from the standpoint of both apparatus and method in order to extrude ground meat in desired separate sheets to be thereafter scrambled together to produce the restructured meat product that is disclosed in an earlier patent, U.S. Pat. No. 4,728,524, by the same inventor.

The thick circular die plates for meat grinders and other machines, such as the afore-referred to Speco, Inc. die plates, are normally perforated throughout the circular area of the die plate, with provision for eliminating bone from meat being ground as in the aforementioned Speco, Inc. patent, but the circular perforations of the die plate may be limited to a relatively small, rectangular area within the circular extent of the die plate as is obtainable in grinder die plates sold by both Speco, Inc. and Robert Reiser & Co., Inc., of Boston, Mass., the round extrusion holes being in multirows for extruding, for example, a continuous, thick, multilayered ribbon-shaped product of beef as hamburger meat. This extruded, multilayered, ribbon-shaped product is cut transversely by a so-called "guillotine" to form hamburger patties.

SUMMARY OF THE INVENTION

In accordance with the present invention, meat of any desired kind, normally free of bone and other hard tissue, is extruded through the extrusion openings of a perforated die, normally a usual, thick type of die plate having mutually opposite broad faces and mutually opposite narrow faces, but one wherein the extrusion openings are moderately elongate and closely spaced end-to-end in their extension sidewise of the broad faces of the die plate to produce products substantially replicating natural, unground, primal cuts of meat, such as steaks, in the provision of side-by-side, longitudinal strands, preferably in multilayers, largely enclosed peripherally by merged extrudate. The strands of the product of the invention are formed of ground meat rather than of natural, unground meat of usual prime cuts.

For enclosing a multilayered product peripherally, the extrusion openings in the internal rows of the die are closely adjacent to each other end-to-end, but do not intercommunicate. However, the extrusion openings of the external rows of the die do intercommunicate end-to-end, but do so leaving enough of intervening portions of the die plate to hold it together as an integrated die, and also preferably leaving the exterior ends of openings at opposite sides of the perforated area of the die plate also intercommunicating by way of passages provided through intervening portions of the die plate. In this way, it becomes possible to extrude through the thickness of the die plate a longitudinally continuous, multilayered product having at least one interior layer made up of separate strands of the extruded material extending closely side-by-side longitudinally of the extruded product and having exterior layers also made up of separate strands of the extruded material. Such external layers extend longitudinally of and along both broad faces and both relatively narrow lateral faces of the product but are interconnected sidewardly in their longitudinal extensions to provide an envelope substantially enclosing the extruded product longitudinally, except for the transverse, cut, edge faces which normally remain open.

Thus, as a part of the present invention, it has been found that ground meat pressed into and extruded through relatively small, moderately elongate, extrusion openings extending closely end-to-end in preferably multiple rows of same as respective multiple layers within the perforated area of an extrusion die plate of a usual grinding or filling machine, or of a similar die associated with some other source of ground meat that is substantially free of bones and other heavy tissue, will be formed as fibrous strands extending longitudinally of the product, and that these strands should be retained in the resulting product so as to substantially correspond in appearance and taste with natural primal cuts of unground meat.

Accordingly, an important aspect of the invention is to produce side-by-side fibrous strands longitudinally of a ground meat extrudate that retain their strand formation in the final extrusion product.

If the protein in the meat becomes soluble, it tends to stick together and to make the product similar to the restructured product of the Gagliardo patents. Therefore, in the commercial meat product of the present invention, the protein should not be made soluble as it is in the Gagliardo product by reason of the mechanical working applied thereto or of materials added thereto.

In accordance with the invention, an intermediate product is preferably made up of longitudinally continuous, side-by-side, fibrous strands of ground meat, that are preferably extruded as a multilayered, ribbon-shaped product, the product being preferably closed along respective longitudinal broad faces and along respective longitudinal, relatively narrow, edge faces, so that, when individual final products are provided by cutting the continuous extrudate transversely at intervals and such products are purchased, uncooked or cooked, the included moisture and meat juices are heated during the cooking and retained about the individual strands to keep them soft and tasteful in addition to giving the appearance of natural, unground, primal cuts of meat, such as steaks.

As previously indicated, the special die of the invention is made up of extrusion openings that are moderately elongate in comparison to the width of a perforated area of the die and are closely spaced end-to-end in a row or rows extending sidewise of the extent of the perforated area of the die plate, preferably with those extrusion openings that are external to the perforated area intercommunicating by way of passages through otherwise obstructing, intervening portions of the die plate to provide a substantially enclosing envelope of extrudate about the extruded, preferably multilayered final product.

Moreover, in accordance with preferred procedure, the protein in the meat product is prevented from disintegrating chemically by contact with solubilizers therefor, as by encapsulation of any solubilizers used or by limiting the extent of any mechanical mixing action.

Although the meat, as ground, may be introduced into the special extrusion die of the invention by a vacuum-filling machine, such as by the aforementioned VEMAG® vacuum-filling machine, the usual head die plate of that machine is replaced by a similar thick type of extrusion die plate of the invention.

THE DRAWINGS

Figure 2:
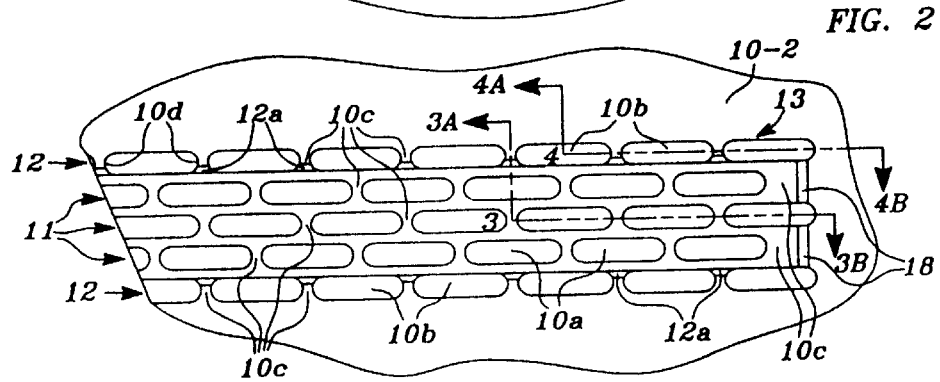
Figure 3:
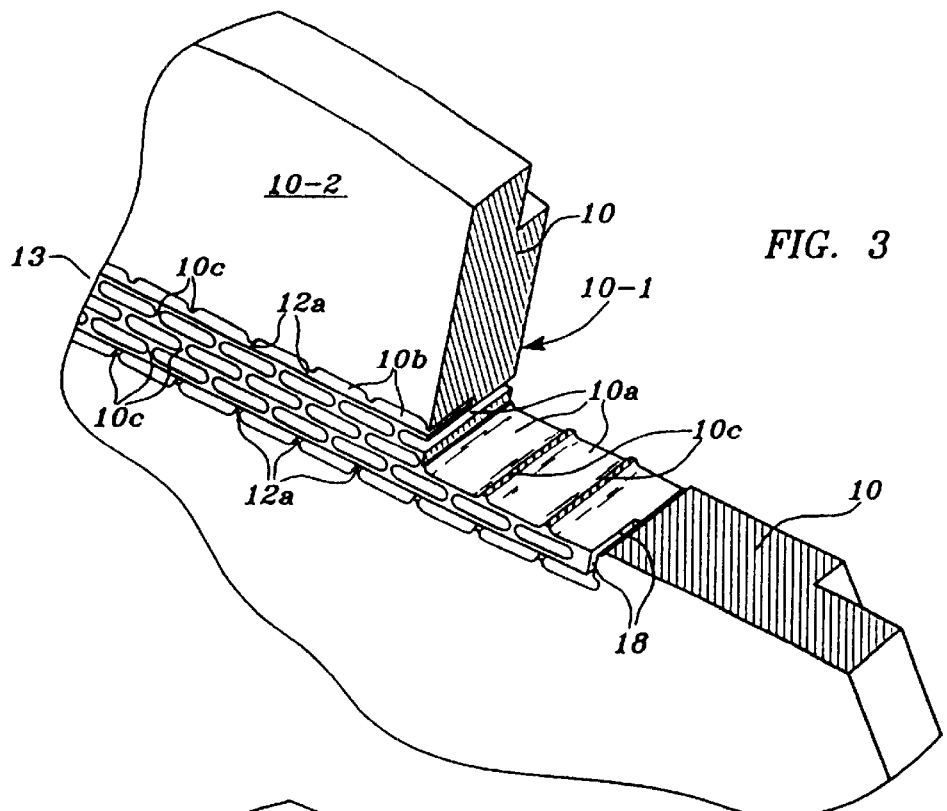
Figure 4:
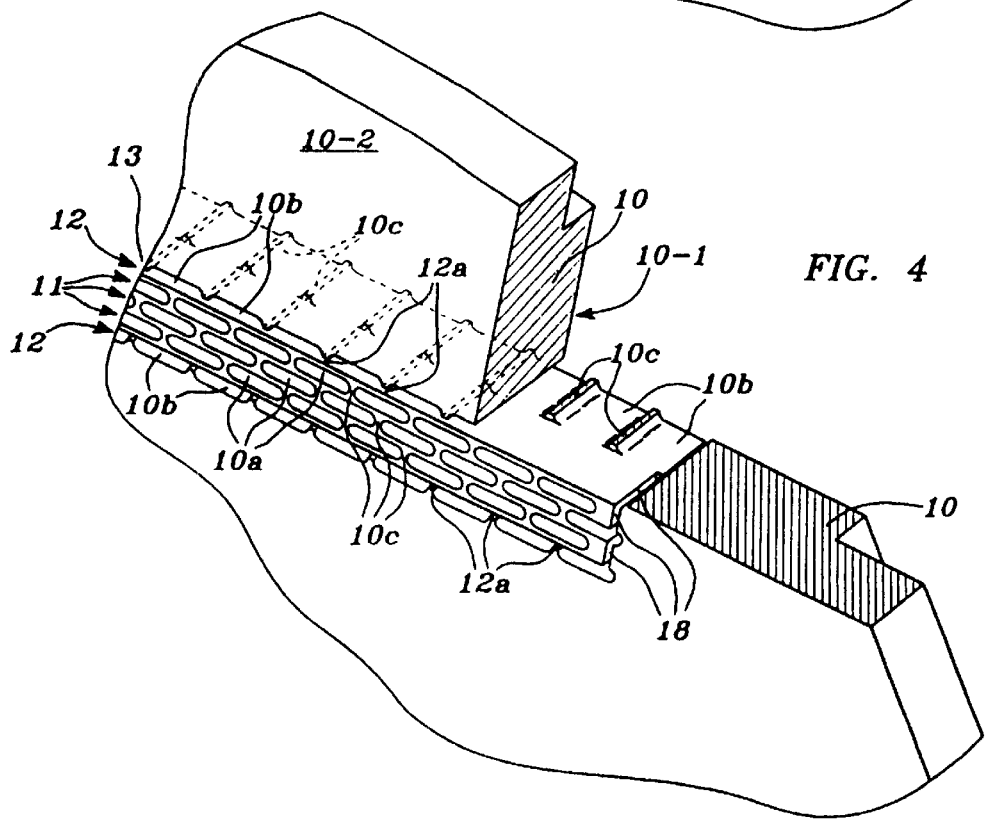
Figure 5:
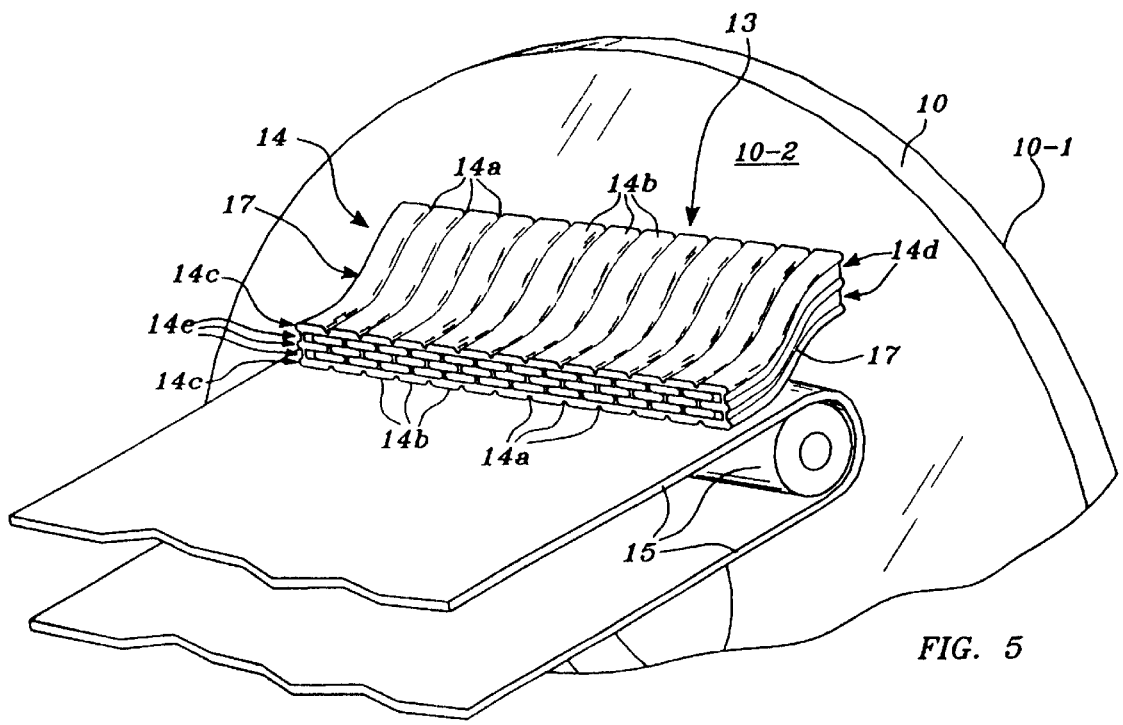
Figure 6:
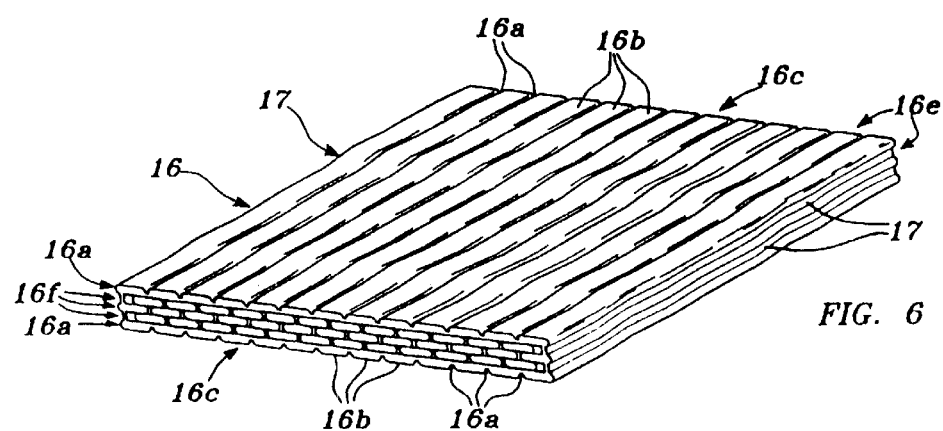

The best mode presently contemplated for carrying out the invention is illustrated in the accompanying drawings, in which:

FIG. 1 represents an elevational view of the outlet face of a preferred embodiment of a circular, thick type, die plate for use as the extrusion die plate of a meat grinder or of merely a vacuum-filling machine;

FIG. 2, an enlarged, fragmentary view of the right hand part of the perforated, upper portion of the die plate of FIG. 1;

FIG. 3, a fragmentary, perspective view partly in vertical section taken along the line 3A–3 of FIG. 2 and partly in horizontal section taken along the line 3–3B of FIG. 2, but this sectional view not being quite as large as is FIG. 2;

FIG. 4, a view similar to that of FIG. 3 but taken along the lines 4A–4 and 4–4B of FIG. 2;

FIG. 5, a fragmentary perspective view of the upper portion of FIG. 1 drawn to a larger scale and showing the die plate as it would be attached to a VEMAG® vacuum-filling machine (not shown) and extruding a multilayer, ribbon-shaped, continuous extrudate intermediate product onto a conveyor belt, yielding the final products of FIG. 6 when cut transversely at intervals; and FIG. 6, a perspective view looking toward and above one cut end of a preferred product embodiment of the invention utilizing the die plate of FIGS. 1–5.

DETAILED DESCRIPTION OF THE ILLUSTRATED EMBODIMENT

As previously indicated, the apparatus of the invention shown in FIGS. 1–5 preferably utilizes a standard vacuum-filling machine (not shown), such as the well-known VEMAG® GB200 PORTIONER produced by Robert Reiser & Co., Inc. of Boston, Mass., but equipped with a novel extrusion head die plate 10 having numerous extrusion die openings 10a closely spaced end-to-end in multiple, interior rows 11 thereof, FIGS. 2 and 4, in and extending across the width of a substantially rectangular, perforated area 13, FIGS. 1 and 3, of such die plate, and having numerous extrusion die openings 10b similarly arranged end-to-end to form exterior rows 12 thereof, in and extending across the width of such perforated area of the die plate.

As illustrated in this preferred embodiment of the apparatus and die of the invention, both sets of extrusion openings extend entirely through the thickness of the die plate, from the broad entry face 10-1, FIGS. 3 and 4, thereof to the broad outlet face 10-2 thereof, and are moderately elongate, i.e. short, sidewise of such broad faces of the die plate in comparison with the width of the perforated area 13 of the die plate, and are short and closely spaced endwise relative to the lengths of the respective rows of same making up rows 11 and 12 thereof and with relatively short, imperforate, intervening portions 10c of the die plate between the adjoining interior extrusion openings 10a and the adjoining exterior extrusion openings 10b of the respective rows.

The openings 10a of interior rows 11, while being closely spaced apart endwise, do not intercommunicate, see FIG. 2, but the openings 10b of exterior rows 12 do intercommunicate by way of relatively narrow passages 12a, FIGS. 2 and 4, through the otherwise imperforate intervening portions 10c of the die plate, which intervening portions provide exterior grooves 14a, see particularly FIG. 5, extending longitudinally of the ribbon-shaped extrudate of an intermediate product 14. Merged exterior strands 14b between such exterior grooves 14a provide exterior layers 14c as broad panel parts of a substantially peripheral envelope about interior layers 14e of extrudate. As shown in FIG. 2, the openings 10b of the end-to-end intercommunicative openings of the bottom exterior row 12 of such openings intercommunicate by the passages 12a in upper ends of the otherwise imperforate, intervening portions 10c of the die plate 10, and the openings 10b of the end-to-end intercommunicative openings of the top exterior row 12 thereof intercommunicate by the passages 12a in the lower ends of the otherwise imperforate, intervening portions 10c of the die plate 10.

The intermediate product 14 is normally deposited on a belt conveyor 15 and is cut transversely at intervals along its length, as by a guillotine cutter (not shown), to provide a longitudinal series of final products 16, FIG. 6, having grooves 16a and merged strands 16b, but with mutually opposite, transversely cut faces. Interior strands of both the elongate extrudate products 14 and of the relatively short final products 16 are thus enclosed peripherally, except at the transversely cut faces, which may be pressed together if desired.

Extending longitudinally along mutually opposite, narrow side faces, respectively, of both the intermediate extrudate product 14 and the final extrusion products 16 are exposed faces of lateral strands 17 of extrudate that flows through up and down passages 18 from the exterior ends of the exterior openings 10b of the exterior rows 12 of the die plate 10 and similar ends of the openings 10a of the interior rows 11 of the die plate.

In the multilayered extrudate products of the invention as illustrated, there are three interior layers 14e or 16f of non-merged, but closely side-by-side positioned, strands, although both the intermediate and the final products need not be multilayered. They could be a single layer of separate, but closely side-by-side positioned, non-merged strands.

The lengths of both of the elongate openings 10a and 10b sidewise of, i.e. along the width of, the die plate, are very short relative to the lengths of the respective rows 11 and 12. Thus, it has been found that, with a circular die plate whose diameter is eight inches, an effective sidewise length of each die opening is 0.265 inches and an effective height is 0.066 inches. These dimensions, as substituted for those of the aforementioned VEMAG® GB200 PORTIONER with its circular extrusion openings about one-eighth of an inch in diameter, pass substantially the same quantity of ground beef per unit.

The only limitation, more or less, on the above dimensions is when the extrudate that is extruded for any particular meat is unsatisfactory from the standpoint of producing strands. The exterior strands of both the intermediate product 14 and the final products 16 and the interior strands thereof are satisfactory as produced by the indicated extrusion openings 10a and 10b of die plate 10 when the meat is ground beef. For other meats, the dimensions and placements of such openings and of the die plate itself may have to be modified somewhat to obtain the desired strands.

Die plate 10 is made from a hardened stainless steel as is usual for extrusion die plates against which knives rotate, either for both pushing and cutting in grinders or primarily for pushing in filling machines, but here, instead of drilling with a usual round drill, the elongate openings are made, at least in part, by electrical discharge machinery (EDM) well-known in the metal fabricating art.

As shown by FIGS. 1 and 2, the perforated area 13 of die plate 10 is made up of the aforementioned multirows of extrusion openings, each of the interior rows 11 being made up of sidewise extending, closely adjacent, end-to-end openings 10a, and each of the exterior rows 12 being made up of similarly extending, closely adjacent, end-to-end openings 10b. The openings of both of these rows 11 and 12 are interrupted internally of the die plate by the solid portions 10c of such die plate, which not only hold the die plate together but separate the openings 10a of the one or more internal rows 11 from each other, see FIG. 3. In the top and bottom exterior rows 12, the extrusion openings 10b intercommunicate by way of the respective passages 12a, FIGS. 2 and 4, provided through portions of their otherwise imperforate intervening portions 10c of the die plate. Moreover, at opposite ends of the perforated area 13 of the die plate 10 in FIG. 1 are provided upwardly and downwardly extending, lateral openings 18, which, if present, receive and pass along extruded material from end openings 10b of the exterior rows 12 and from openings 10a of the one or more interior rows 11 intersected by such passages 18. This means that the mutually opposite, broad faces of the intermediate product 14 and of the relatively narrow, lateral faces thereof, FIG. 5, and that the correspondingly broad faces and relatively narrow, lateral faces of the final products 16, FIG. 6, are protectively closed substantially peripherally by, in effect, respective envelopes 14d and 16e, except along the transversely cut end faces 16c thereof, and that the stranded nature of the intermediate product 14 and of the final products 16 is visually exposed.

It has been found advantageous in both the making of the elongate extrusion openings 10a and 10b of the die plate 10, and in the use of such die plate, that the openings be substantially rectangular lengthwise with outwardly curved, preferably semi-circular, ends 10d, FIG. 2.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

What is claimed is:

1. A perforated die plate for a machine supplying ground meat under pressure, said die plate having mutually opposite, broad, material entry and material outlet faces and multiple, sidewise-extending rows, one above another, of extrusion openings as perforations extending between and into said faces, for receiving and passing ground meat between said faces, said openings in each of said rows being elongate and closely spaced end-to-end by imperforate intervening portions of the die plate, but short relative to the length of the rows, for receiving ground meat and discharging it from said rows as continuous expanses of substantially merged, side-by-side, longitudinal strands of the ground meat as muscle fibers, said expanses together simulating a natural cut of unground meat, the expanses of extrudate from said multiple rows being one above another as layers in a ribbon-shaped product of the machine; wherein the multiple rows of perforations include at least one interior row thereof in which said extrusion openings are non-communicative and separated by said imperforate intervening portions of the die plate; and wherein said multiple rows of perforations also include a top exterior row and a bottom exterior row of said extrusion openings that are respectively interconnected endwise by passages extending through their said imperforate intervening portions of the die plate to provide top and bottom, exterior expanses of said merged strands of extrudate as respective layers protectively covering the interior extrudate layer or layers of said product, but leaving part of their said otherwise imperforate intervening portions of the die plate holding the die plate together.

2. A die plate according to claim 1, wherein there are interior rows of the extrusion openings which are independent of other interior rows so as to extrude corresponding multiple layers of the side-by-side strands simulating the meat of a natural cut of unground meat in the product.

3. A die plate according to claim 1, wherein the extrusion openings at the ends of the exterior rows thereof intercommunicate by up and down passages extending through otherwise imperforate intervening portions of the die plate and through any extrusion openings at the ends of the at least one interior row intersected by the up and down passages to produce extrudate providing lateral portions of an envelope of extrudate substantially enclosing the interior layer or layers of the ribbon-shaped product peripherally.

4. A die plate according to claim 1, wherein the multiple rows of extrusion openings of the die plate provide a substantially rectangular perforated area through which are extruded multiple layers of the ribbon-shaped extrudate product of the machine that can be cut transversely at intervals to yield respective lengths of final products.

5. A die plate according to claim 1, wherein the extrusion openings in the rows thereof are substantially rectangular, with outwardly curved opposite ends.

6. A die plate according to claim 4, wherein the openings of the end-to-end intercommunicative openings of the bottom exterior row intercommunicate by said passages in upper ends of the imperforate intervening portions of the die plate, and wherein the openings of the end-to-end intercommunicative openings of the top exterior row intercommunicate by said passages in lower ends of said otherwise imperforate intervening portions of the die plate.

7. A die plate according to claim 6, wherein the extrusion openings of the rows thereof are substantially rectangular with outwardly curved opposite ends.

8. An apparatus for extruding ground meat products, comprising an extrusion die plate for attachment to a vacuum-filling machine as the head plate thereof, said die plate having mutually opposite, broad, material entry and material outlet faces and multiple, sidewise-extending rows, one above another, of extrusion openings as perforations extending between and into said faces, for receiving and passing ground meat between said faces, said openings in each of said rows being elongate and closely spaced end-to-end by imperforate intervening portions of the die plate, but short relative to the length of the row, for receiving ground meat and discharging it from said rows as continuous expanses of substantially merged, side-by-side, longitudinal strands of the ground meat as muscle fibers, said expanses together simulating a natural cut of unground meat, the expanses of extrudate from said multiple rows being one above another as layers in a ribbon-shaped product of the machine; wherein the multiple rows of perforations include at least one interior row thereof in which said extrusion openings are non-communicative and separated by said imperforate intervening portions of the die plate; and wherein said multiple rows of perforations also include a top exterior row and a bottom exterior row of said extrusion openings that are respectively interconnected endwise by passages extending through their said imperforate intervening portions of the die plate to provide top and bottom, exterior expanses of said merged strands of extrudate as respective layers protectively covering the interior extrudate layer or layers of said product, but leaving part of their said imperforate intervening portions of the die plate holding the die plate together.

9. An apparatus according to claim 8, wherein the top and bottom rows of openings in the die plate have the end openings intercommunicating by up and down passages through otherwise imperforate intervening portions of said die plate so as to form an envelope of the extrudate that substantially encloses the interior extrudate layer or layers in the products of the apparatus.

10. Apparatus according to claim 8, wherein each opening in the rows, thereof is substantially rectangular with opposite ends that are outwardly curved.

11. A die plate having perforations for extruding ground meat as a product substantially replicating the meat of a cut of natural unground meat, the die plate comprising numerous extrusion openings providing said perforations and extending through the die plate in closely spaced, end-to-end relationship forming multiple rows thereof, the extrusion openings being separated by imperforate portions of the die plate, and these said openings in exterior rows of said perforations having flow passages from opening to opening through their otherwise imperforate intervening portions of the die plate to provide exterior expanses of merged strands of extrudate as layers covering at least one interior layer formed from at least one interior row, but leaving sufficient portions of said otherwise imperforate intervening portions to hold the die plate together.

12. A die plate according to claim 11, wherein the top and bottom rows of openings in the die plate have the end openings intercommunicating by up and down passages through otherwise imperforate intervening portions of said die plate so as to form an envelope of the extrudate that substantially encloses the interior extrudate layer or layers in the products of the apparatus.

13. A die plate according to claim 11 wherein the extrusion openings in the rows thereof are substantially rectangular with outwardly curved opposite ends.

* * * * *